US008775948B2

(12) United States Patent
Ark et al.

(10) Patent No.: US 8,775,948 B2
(45) Date of Patent: Jul. 8, 2014

(54) METHOD FOR CAPTURING COLLABORATIVE, REAL-TIME FEEDBACK ON SOCIO-TECHNICAL INTERACTIONS IN A VIRTUAL ENVIRONMENT AND GRAPHICALLY DISPLAYING THE INTERACTION PATTERNS FOR LATER REVIEW

(75) Inventors: Wendy Sue-Feung Ark, San Diego, CA (US); Ankur Chandra, San Jose, CA (US); Susan Unrau Stucky, La Honda, CA (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 12/633,341

(22) Filed: Dec. 8, 2009

(65) Prior Publication Data
US 2011/0138303 A1   Jun. 9, 2011

(51) Int. Cl.
*G06F 3/00* (2006.01)
*G06F 11/30* (2006.01)
*H04L 12/18* (2006.01)
*G06F 11/07* (2006.01)
*G06Q 10/10* (2012.01)

(52) U.S. Cl.
CPC ........ *G06F 11/3006* (2013.01); *G06F 11/0712* (2013.01); *G06F 11/301* (2013.01); *G06Q 10/10* (2013.01); *H04L 12/1831* (2013.01)
USPC ....................................................... 715/753

(58) Field of Classification Search
CPC  G06Q 10/10; H04L 12/1831; G06F 11/0712; G06F 11/3006; G06F 11/301

USPC .......................................................... 715/753
See application file for complete search history.

(56) References Cited

U.S. PATENT DOCUMENTS

| | | | |
|---|---|---|---|
| 6,067,537 A | | 5/2000 | O'Connor et al. |
| 6,119,147 A | * | 9/2000 | Toomey et al. ............... 709/204 |
| 6,993,513 B2 | | 1/2006 | Beams et al. |
| 7,065,153 B2 | | 6/2006 | Bach et al. |
| 7,386,524 B2 | | 6/2008 | Hubbell et al. |
| 7,945,622 B1 | * | 5/2011 | Pegg ............................. 709/204 |
| 2003/0187725 A1 | * | 10/2003 | Jotkowitz ........................ 705/11 |
| 2004/0006566 A1 | | 1/2004 | Taylor et al. |
| 2006/0282304 A1 | * | 12/2006 | Bedard et al. .................... 705/10 |
| 2007/0013691 A1 | * | 1/2007 | Jung et al. ..................... 345/419 |
| 2007/0100938 A1 | * | 5/2007 | Bagley et al. ................. 709/204 |
| 2007/0240119 A1 | * | 10/2007 | Ducheneaut et al. ......... 717/124 |

(Continued)

OTHER PUBLICATIONS

Macaulay et al., Facilitation of e-Meetings: states-of-the-art review; published: 2005; 8 pages.*

(Continued)

*Primary Examiner* — Linh K Pham
(74) *Attorney, Agent, or Firm* — IP Authority, LLC; Ramraj Soundararajan

(57) ABSTRACT

A method provides users with a simple way to give real-time feedback during a collaborative activity in a virtual environment, which can then be captured and synchronized with other aspects of the interactions such as verbal communication, text messaging, and the activity they were completing for later review. The patterns of activity can then be displayed graphically to easily visualize the patterns of interactions that occurred during the collaboration. Comments by reviewers can be inserted into the record of the interaction after looking over the graphical display.

11 Claims, 5 Drawing Sheets

(56) References Cited

U.S. PATENT DOCUMENTS

| | | | |
|---|---|---|---|
| 2007/0259326 A1* | 11/2007 | Marco | 434/350 |
| 2008/0133600 A1* | 6/2008 | Uehori et al. | 707/104.1 |
| 2008/0137558 A1* | 6/2008 | Baird | 370/260 |
| 2009/0070128 A1* | 3/2009 | McCauley et al. | 705/1 |
| 2009/0083383 A1* | 3/2009 | Piper et al. | 709/206 |
| 2009/0089683 A1* | 4/2009 | Thapa | 715/756 |
| 2009/0254840 A1* | 10/2009 | Churchill et al. | 715/753 |
| 2010/0037151 A1* | 2/2010 | Ackerman et al. | 715/753 |
| 2010/0114985 A1* | 5/2010 | Chaudhary et al. | 707/803 |
| 2010/0199182 A1* | 8/2010 | Lanza et al. | 715/723 |
| 2010/0262267 A1* | 10/2010 | Alexandrov et al. | 700/94 |
| 2011/0040787 A1* | 2/2011 | Cierniak et al. | 707/770 |

OTHER PUBLICATIONS

Garcia et al., Emotional Awareness in Collaborative Systems; Published 1999; IEEE; 8 pages.*

C. Jay et al., "Modeling the Effects of Delayed Haptic and Visual Feedback in a Collaborative Virtual Environment," 2007 ACM Transactions on Computer-Human Interaction, V14,N2, Article 8, published Aug. 2007, 31pgs.

M. Costabile et al., "Supporting Interaction and Co-evolution of Users and Systems," AVI '06, May 23-26, 2006, Venezia, Italy, pp. 143-150.

A. Girgensohn et al., "Making Web Sites Be Places for Social Interaction," CSCW '02, Nov. 16-20, 2002, New Orleans, Louisiana, USA, pp. 136-145.

* cited by examiner

METHOD FOR CAPTURING COLLABORATIVE, REAL-TIME FEEDBACK ON SOCIO-TECHNICAL INTERACTIONS IN A VIRTUAL ENVIRONMENT AND GRAPHICALLY DISPLAYING THE INTERACTION PATTERNS FOR LATER REVIEW

BACKGROUND OF THE INVENTION

1. Field of Invention

The present invention relates generally to the field of real-time social interactions in virtual environments. More specifically, the present invention is related to providing a mechanism for capturing and reviewing a social interaction, including all of the associated feedback given during the interaction.

2. Discussion of Related Art

In virtual environments, people are able to use their avatars to collaborate by getting together and interacting with other avatars much as people do in the real world. When collaborating, they can give presentations, discuss issues, go places, work together, and use tools in the environment that may be linked to real world tools such as data centers Akin to real world interactions, virtual world interactions are ephemeral, but the value of the collaboration is not merely the completion of the activity, but in the patterns of interaction that occurred in order to complete the activity.

Capturing the interactions, especially the evidence of rapid cognition, which is understood to be crucial in the decision making process, and the real-time feedback linked to the current activity, could be very difficult in the real world. One could video record the activity, but it would not capture the entirety of the interactions because there are a number of things happening that cannot be fully captured by a single camera: avatars communicating through verbal and non-verbal communication (e.g., gesturing, using body language, eye contact, etc), using text chats, and using tools in the environment.

It is also difficult to review these video-taped interactions for both highlights of the interactions or particular types of interactions. Reviewing video tape is a slow and arduous process, especially when looking for slight non-verbal cues that avatars might give when providing real-time feedback (e.g. nodding or shaking head)

An added difficulty when reviewing collaborative activities is capturing enough of the activity itself (e.g. which slide was currently being reviewed in the presentation when an avatar nodded his head to agree with the statement that was made). What is lacking in the prior art is a system and method that synchronizes the avatar interactions with the specific activity being done or tool that was being used.

FIGS. 1 and 2 show an example of the prior art that allows for real-time feedback in a virtual environment. FIG. 1 illustrates an interaction between two users in virtual environment 120. Each user has real-time feedback interface 110 or 112. As shown in FIG. 2, a user initiates the communication in step 210 and may choose a real-time feedback option in step 220. The chosen feedback is displayed in the virtual environment in step 230, and each user can choose another feedback option at a later time by returning back to step 220.

SUMMARY OF THE INVENTION

A computer implemented method of recording comments from a virtual environment comprising the steps of recording an interactive communication session between a plurality of entities, recording feedback from at least one of the entities throughout the session, and correlating the feedback with the session record. After the session is complete, the recorded session and correlated feedback is rendered in a graphical form; and a reviewer saves comments relating to the session and feedback. An article of manufacture for recording comments from a virtual environment comprising computer readable program code for recording an interactive communication session between a plurality of entities, computer readable program code for recording feedback from at least one of the entities throughout the session, computer readable program code for correlating the feedback with the recording of the session, computer readable program code for rendering the recorded session and correlated feedback in a graphical form, and computer readable program code for receiving reviewer comments relating to the session and feedback.

A computer implemented method of recording comments from a virtual environment comprising the steps of recording an interactive communication session between a plurality of entities, recording feedback from at least one of the entities, and correlating the feedback with the recording of the session through time stamps. After the session is complete, the recorded session and correlated feedback is rendered in a graphical form for a reviewer. The reviewer selects a time stamp within the session and makes comments related to the session at the selected time. The comments are correlated with the selected time stamp and the comments and session are stored as a single presentation.

DESCRIPTION OF THE PREFERRED EMBODIMENTS

Figure 1:
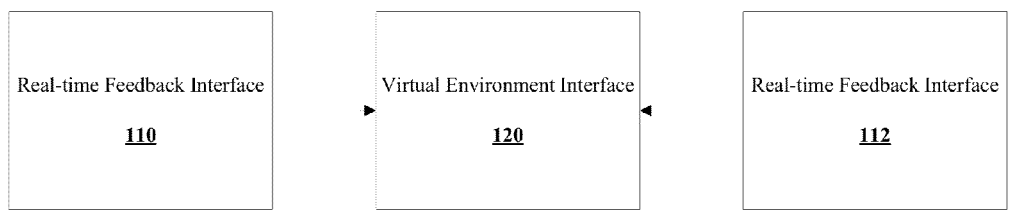
FIG. 1 illustrates a prior art embodiment of a virtual environment with real-time feedback.
Figure 2:
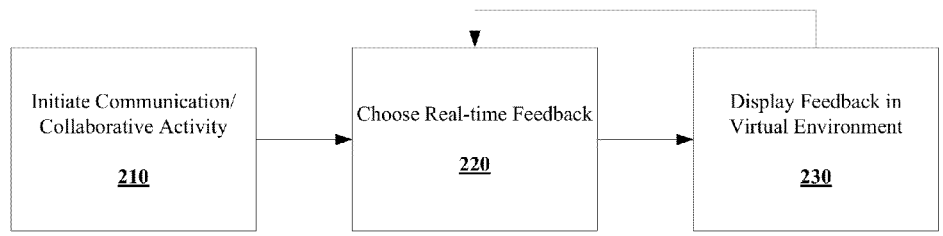
FIG. 2 illustrates a prior art method of real-time feedback in a virtual environment.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 3:
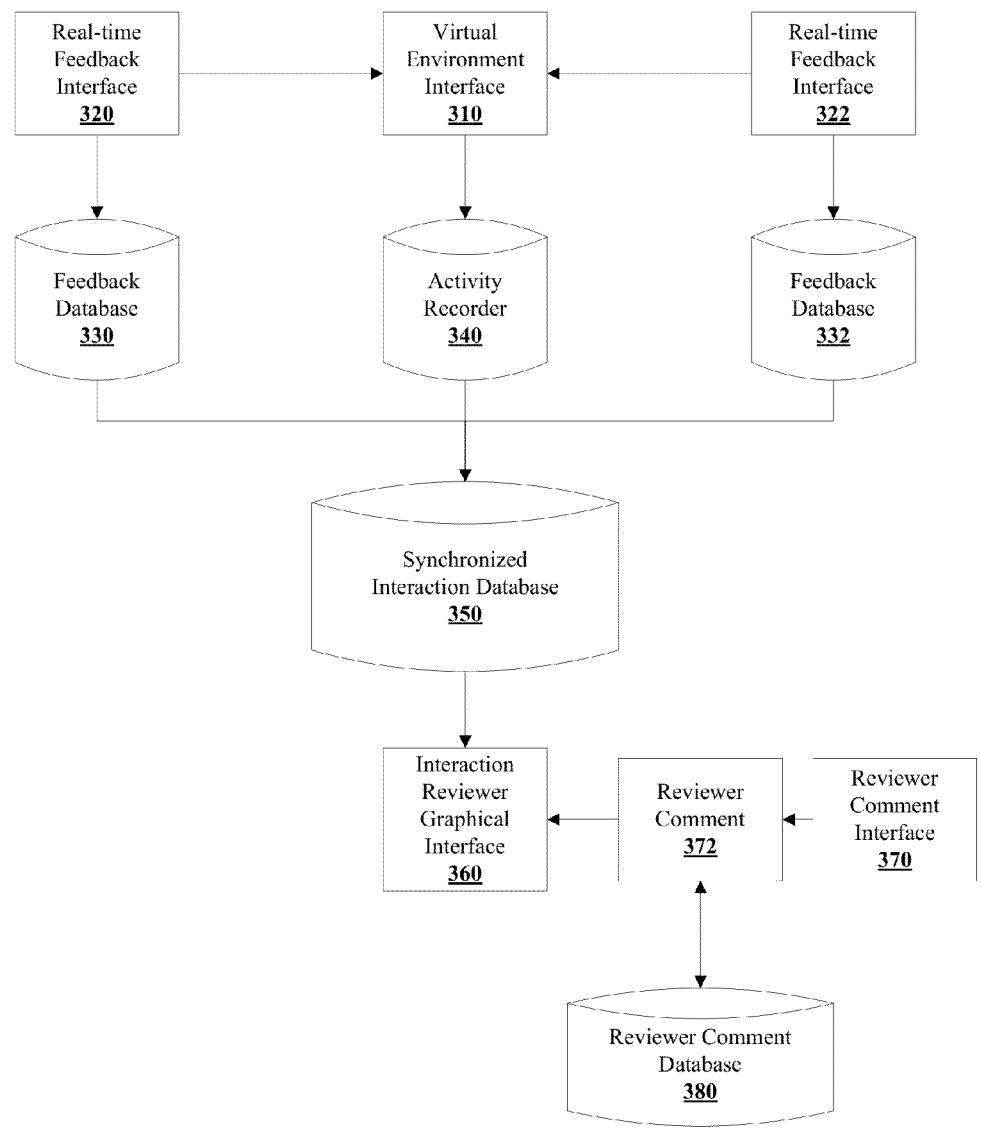
FIG. 3 illustrates an exemplary system of the present invention.

Disclosed are systems and methods to provide users with a simple way to give real-time feedback during a collaborative activity in a virtual environment, which can then be captured and synchronized with other aspects of the interactions such as verbal communication, text messaging, and the activity they were completing for later review. The patterns of activity can then be displayed graphically to easily visualize the patterns of interactions that occurred during the collaboration. Specific embodiments of a virtual environment include, but are not limited to, online environments, social networks, teleconferences, and video conferences. FIG. 3 shows an exemplary system of the components used in the present invention by at least two users in a virtual environment. Virtual environment interface 310 allows each user to interact in the virtual environment. The context of the situation (e.g., listening to a presentation, interacting with a client, teaching a class) determines the choices for feedback. Each time feedback is chosen in interface 320 or 322, the feedback is recorded in feedback database 330 or feedback database 332, respectively. The entire collaborative activity is recorded as an interactive communication session on activity recorder 340. Activity recorder 340 may record a number of different methods of communication between the users, including video and text messaging, as well as any direct interaction between the users' avatars. All of the recordings are synchronized and stored as a record in synchronized interaction database 370.

After the collaborative communication session is complete, a reviewer can view a graphical representation of the interaction combined with the recorded real-time feedback of each of the users. The graphical representation is rendered in interaction reviewer graphical interface 360. In reviewing the session, the reviewer may insert his or her own comment 372 through reviewer comment interface 370. Comment 372 is stored in reviewer comment database 380.

Figure 4:
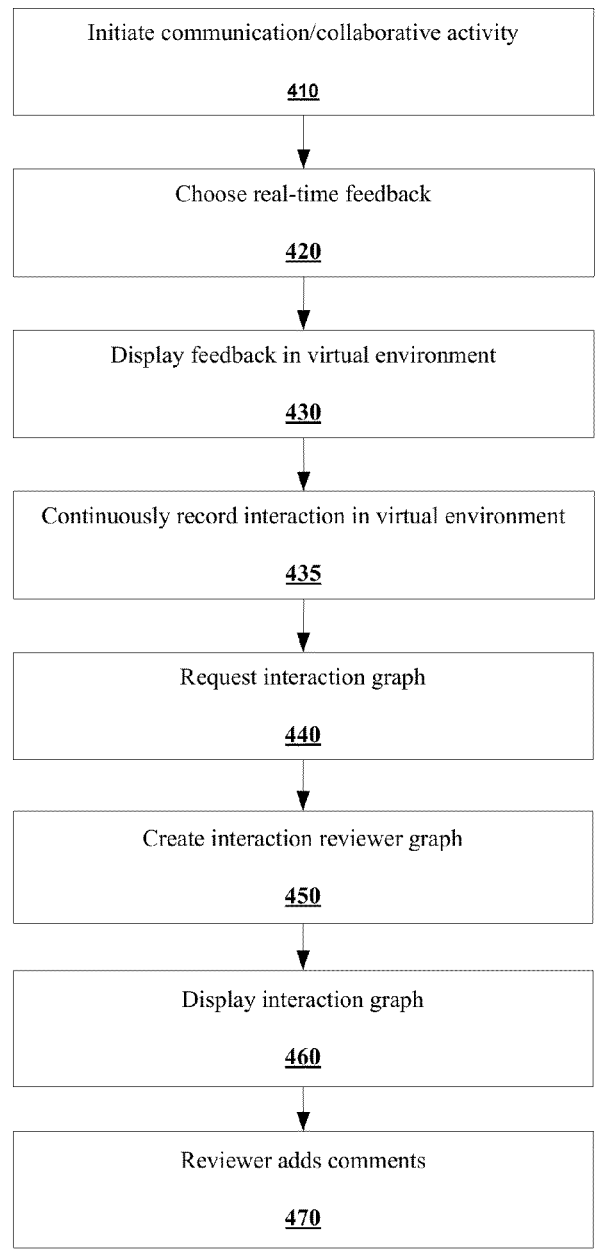
FIG. 4 illustrates an exemplary method of the present invention.

FIG. 4 shows an exemplary method of the present invention. In step 410, users initiate an interactive communication session in a virtual environment. In step 420, a user may provide real-time feedback through interface 320, which is recorded in feedback database 330. A user can provide additional real-time feedback through interface 320 at a later time in the session. Feedback database 330 continuously records feedback selected by the users throughout the session. In step 430, virtual environment interface 310 displays the real-time feedback. In step 435, activity database 340 continuously records the interaction that takes place in the virtual environment.

After the communication session is completed, a reviewer initiates the review process in step 440 by requesting an interaction graph. A graph integrating the activity recorded in the session with the feedback recorded from the session is created in step 450 and displayed to the reviewer in step 460. In step 470, the reviewer may add comments relating to a specific time period of the session. After adding the reviewer's comments, the interaction graph is updated by returning to step 460 and displaying an updated interaction graph which reflects the added comments. The reviewer comments are stored in reviewer comment database 380 and are integrated into further graphical representations of the communication session.

Figure 5:
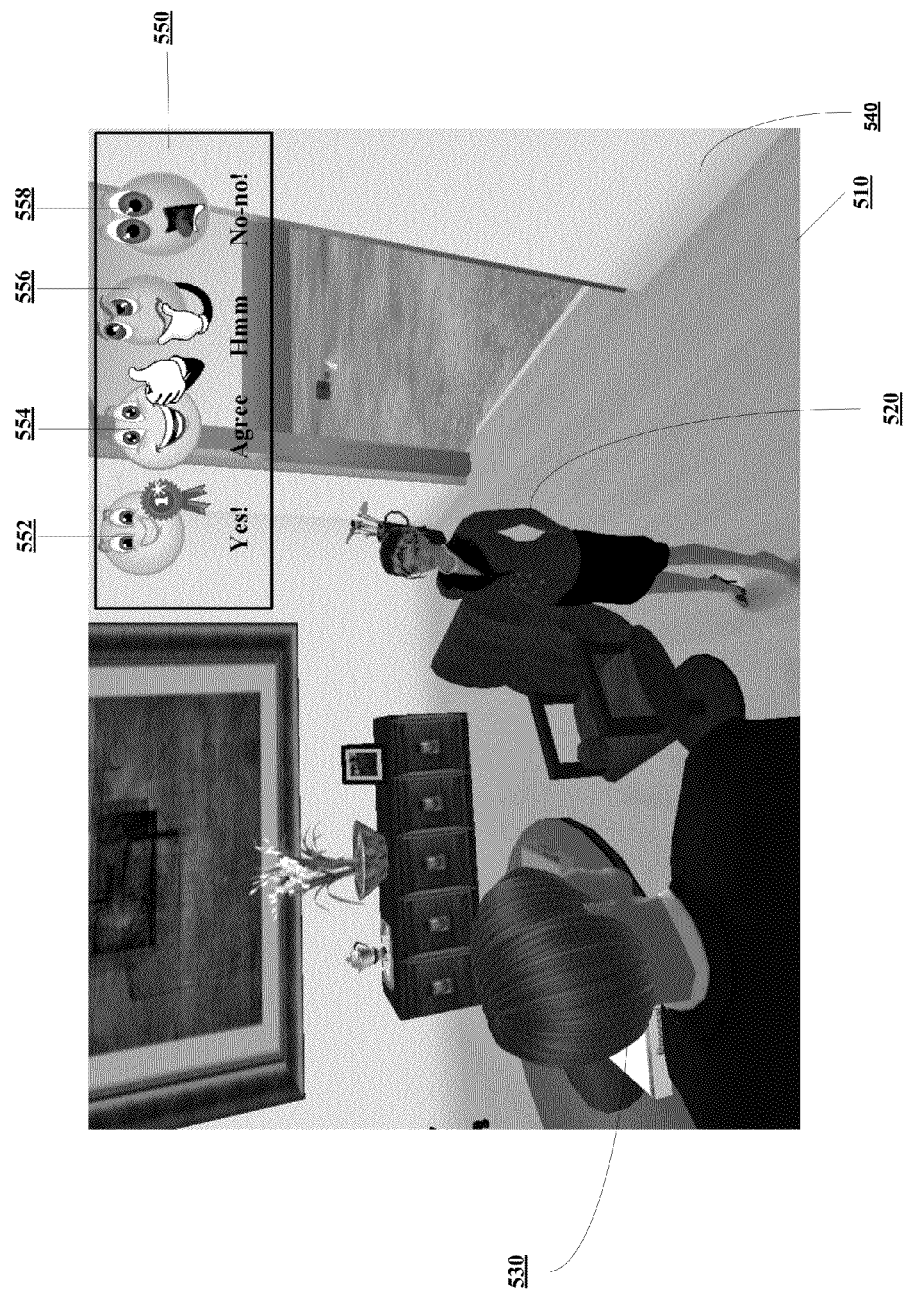
FIG. 5 illustrates an embodiment of the real-time feedback.

FIG. 5 shows further details of an embodiment of virtual environment interface with a real-time feedback interface. Virtual environment interface 510 allows users to interact through avatars 520 and 530, and through objects in the environment such as conference room 540. Overlaid on virtual environment interface 510 is real-time feedback interface 550, which allows a user to select one of a plurality of predetermined options 552, 554, 556, and 558.

Figure 6:
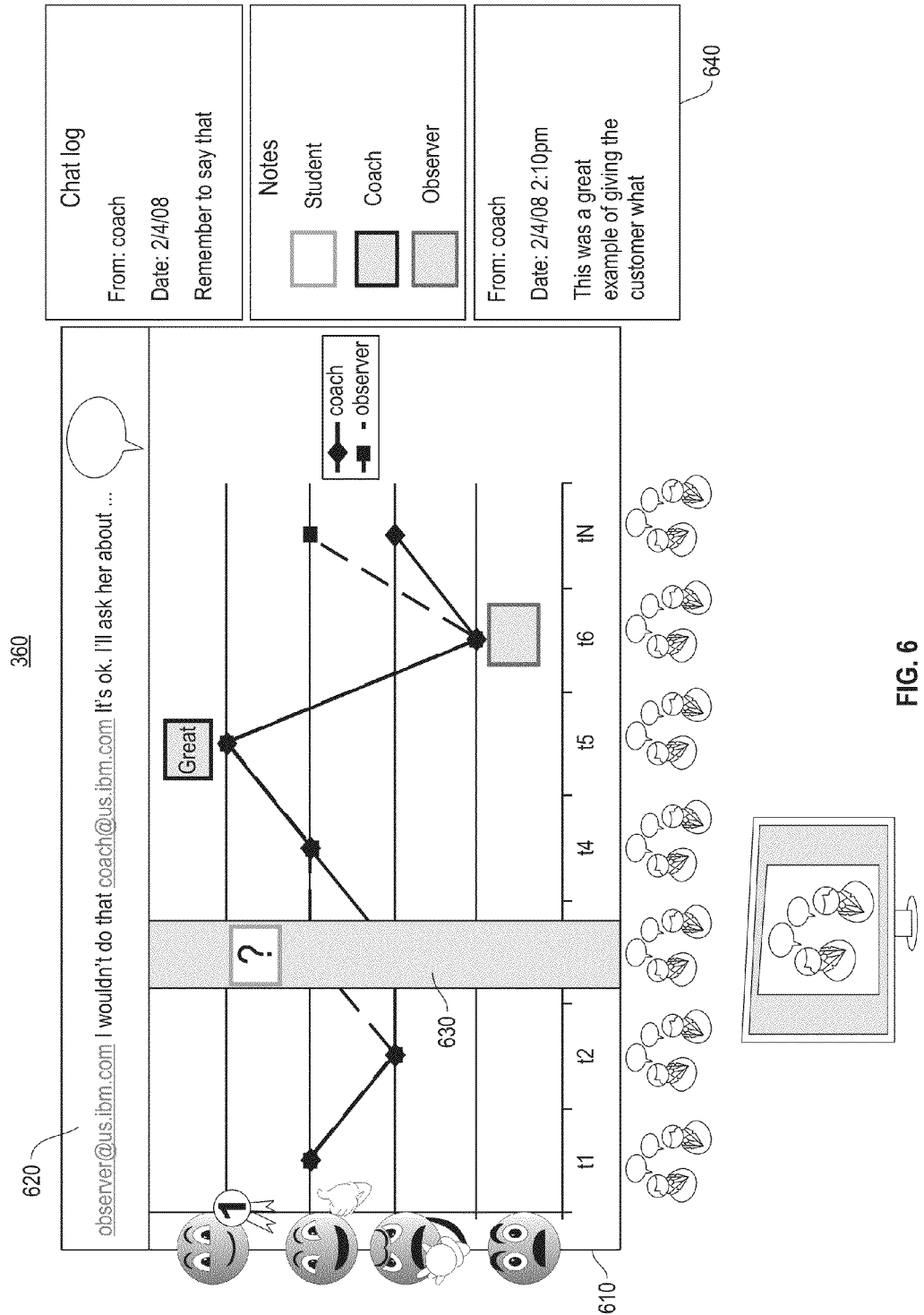
FIG. 6 illustrates an embodiment of the reviewer interface.

FIG. 6 shows further details of an embodiment of interaction reviewer graphical interface 360. In this embodiment reviewer interface 360 contains feedback graph 610, which displays the real-time feedback selected by any of the participants in the communication session as a function of time. Chat synopsis 620 displays at least a portion of a chat that occurred during the session, correlated with the time axis of feedback graph 610. A reviewer makes a selection of time stamp t3, shown by highlighted section 630, and adds comment 640 relating to the interaction at time t3. Additionally, an embodiment of the present invention provides for an article of manufacture comprising computer readable program code contained within implementing one or more modules to record comments on an interactive communication session. Furthermore, an embodiment of the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for:

(a) recording an interactive communication session between a plurality of entities;

(b) recording feedback from at least one of said plurality of entities;

(c) correlating said feedback with said recording of the session;

(d) rendering the recorded session and correlated feedback in a graphical form;

(e) receiving a selection of a portion of the session;

(f) receiving comments from a reviewer relating to the selected portion of the session;

(g) correlating the comments with the selected portion of the session; and (h) storing the correlated comments and session as a single presentation.

CONCLUSION

A system and method has been shown in the above embodiments for the effective implementation of a method for capturing collaborative, real-time feedback on socio-technical interactions in a virtual environment and graphically displaying the interaction patterns for later review. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by the number or type of feedback options in the list of predetermined options, the number of users participating in the interactive communication session, or the type of activity recorded in the interactive communication session.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of network computer programming.

The invention claimed is:

1. A computer implemented method of recording comments from a virtual environment, said method comprising:

recording to a memory an interactive communication session between a plurality of entities;

recording to the memory feedback from at least one of said plurality of entities throughout the session, said feedback selected from a plurality of predetermined options;

correlating by a processor said feedback with said recording of the session and storing a first time stamp associated with said feedback;

after the session is complete, rendering the recorded session and correlated feedback as a feedback graph displaying said feedback as a function of time;

receiving a selection of a portion of the session in said feedback graph from a reviewer;

receiving comments from said reviewer relating to the selected portion of the session in said feedback graph;

correlating said received comments with the selected portion of the session in said feedback graph and storing a second time stamp associated with said received comments; and storing the correlated comments and session as a single presentation.

2. The method of claim 1, wherein the virtual environment for said session is an online environment.

3. The method of claim 2, wherein said online environment is a social network.

4. The method of claim 1, wherein the virtual environment for said session is one of a teleconference or video conference environment.

5. A non-transitory computer readable storage medium storing computer readable program code, which when executed by a computer, records comments from a virtual environment, said non-transitory computer readable storage medium comprising:

computer readable program code for recording an interactive communication session between a plurality of entities;

computer readable program code for recording feedback from at least one of said plurality of entities throughout the session, said feedback selected from a plurality of predetermined options;

computer readable program code for correlating said feedback with said recording of the session and storing a first time stamp associated with said feedback;

computer readable program code for rendering the recorded session and correlated feedback as a feedback graph displaying said feedback as a function of time after said session is complete;

computer readable program code for receiving a selection of a portion of the session in said feedback graph from a reviewer;

computer readable program code for receiving comments from said reviewer relating to the selected portion of the session in said feedback graph;

computer readable program code for correlating said received comments with the selected portion of the session in said feedback graph; and computer readable program code for storing the correlated comments and session as a single presentation along with a second time stamp associated with said received comments.

6. The non-transitory computer readable storage medium of claim 5, wherein the virtual environment for said session is an online environment.

7. The non-transitory computer readable storage medium of claim 6, wherein said online environment is a social network.

8. The non-transitory computer readable storage medium of claim 5, wherein the virtual environment for said session is one of a teleconference or video conference environment.

9. A computer implemented method of recording comments from a virtual environment, said method comprising:

recording an interactive communication session between a plurality of entities;

recording feedback from at least one of said plurality of entities throughout the session, said feedback selected from a plurality of predetermined options;

correlating said feedback with said recording of the session through time stamps;

after the session is complete, rendering the recorded session and correlated feedback as a feedback graph displaying said feedback as a function of time;

receiving a selection in said feedback graph of a time stamp within the session;

receiving comments from a reviewer relating to the session at the selected time in said feedback graph;

correlating the comments with the selected time stamp; and storing the correlated comments and session as a single presentation.

10. A system for recording comments from a virtual environment, said system comprising:

a memory configured to receive and store:
   an interactive communication session between a plurality of entities;
   a feedback from at least one of said plurality of entities throughout the session, said feedback selected from a plurality of predetermined options;

a processing module coupled to the memory and configured to correlate said feedback with said recording of the session and storing a first time stamp associated with said feedback;

a rendering module coupled to the processing module and configured to render the recorded session and correlated feedback as a feedback graph displaying said feedback as a function of time; and an input module configured to receive reviewer comments relating to the session and feedback in response to rendering the recorded session and correlated feedback to a reviewer, said input module further configured to: receive a selection of a portion of the session in said feedback graph; receive reviewer's comments from a reviewer relating to the selected portion of the session in said feedback graph; correlate said reviewer's comments with the selected portion of the session in said feedback graph; and store said correlated comments and session as a single presentation and further storing a second time stamp associated with said reviewer's comments.

11. The system of claim 10, wherein said virtual environment is a social network.

* * * * *